United States Patent [19]

Kolm et al.

[11] 3,871,301

[45] Mar. 18, 1975

[54] STABILIZATION AND RIDE CONTROL OF SUSPENDED VEHICLES PROPELLED BY A LINEAR MOTOR

[75] Inventors: Henry H. Kolm, Wayland; Richard D. Thornton, Concord, both of Mass.

[73] Assignee: Massachusetts Institute of Technology, Cambridge, Mass.

[22] Filed: Sept. 17, 1973

[21] Appl. No.: 398,116

Related U.S. Application Data

[63] Continuation-in-part of Ser. No. 259,518, June 5, 1972, abandoned.

[52] U.S. Cl. .................... 104/148 SS, 104/148 LM
[51] Int. Cl. ........................................ B61b 13/08
[58] Field of Search ............... 104/148 MS, 148 SS

[56] References Cited
OTHER PUBLICATIONS

The Magneplane: Guided Electromagnetic Flight, Kolm and Thornton, IEEE Proc. of the 1972 Applied Superconductivity Conf., May 1 – 3, 1972, Annapolis, Md., IEEE pub. No. 72CH0682-5-TABSC.

Primary Examiner—M. Henson Wood, Jr.
Assistant Examiner—Reinhard J. Eisenzopf
Attorney, Agent, or Firm—Arthur A. Smith, Jr.; Robert Shaw; Martin M. Santa

[57] ABSTRACT

Apparatus to provide stabilization and active damping of oscillations of a magnetically levitated vehicle and the like. The apparatus includes inertial and position sensors on the vehicle and a linear synchronous motor, signals from the sensor being connected through a feedback path to control the motor. The reaction forces supplied by the motor to effect such stabilization and oscillation damping are short-term or of a pulsed nature. The vehicle can include a magnetic keel arrangement as part of the synchronous motor, which acts to provide a passive righting force upon the vehicle but which can interact in the system in an active way, as well.

17 Claims, 8 Drawing Figures

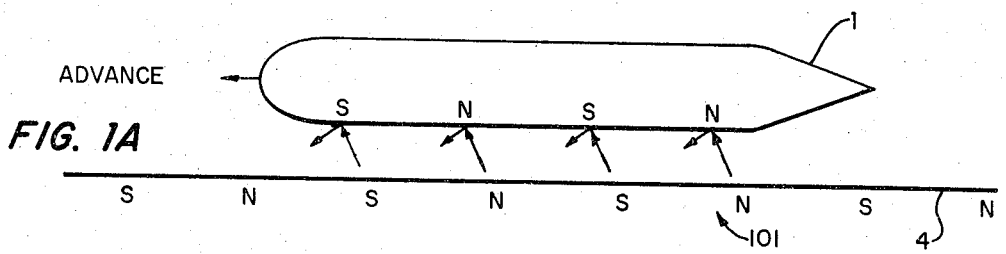
FIG. 1A  ADVANCE
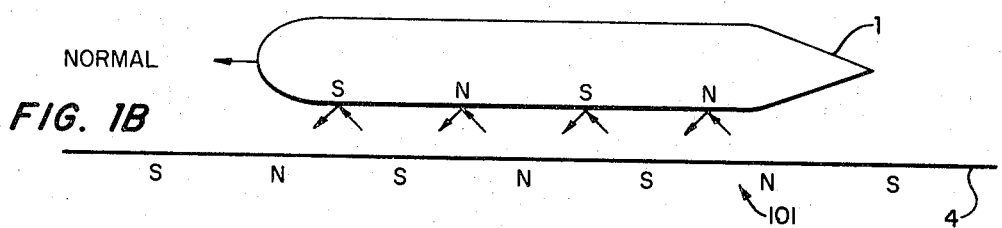
FIG. 1B  NORMAL
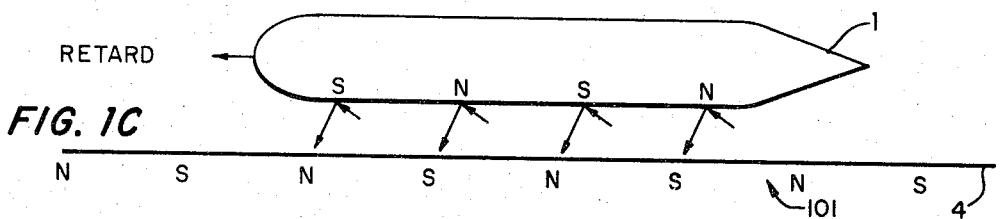
FIG. 1C  RETARD
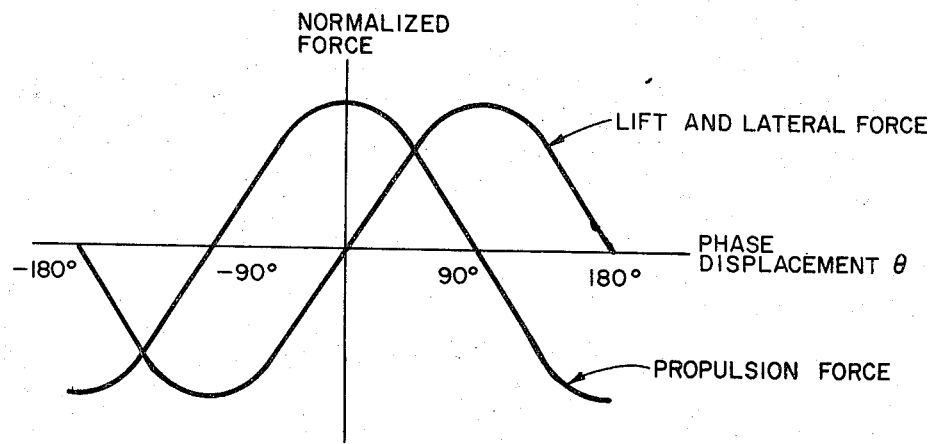
FIG. 2

PATENTED MAR 18 1975 3,871,301
SHEET 2 OF 3
FIG. 3
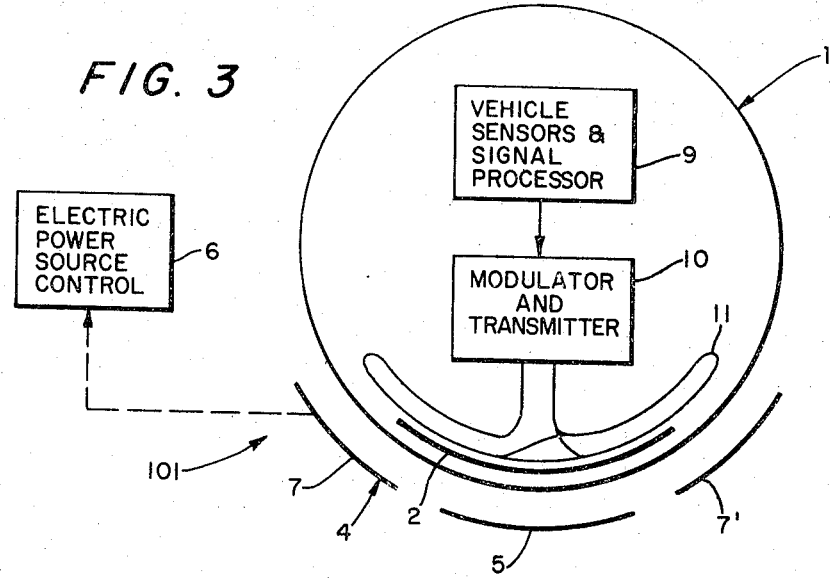
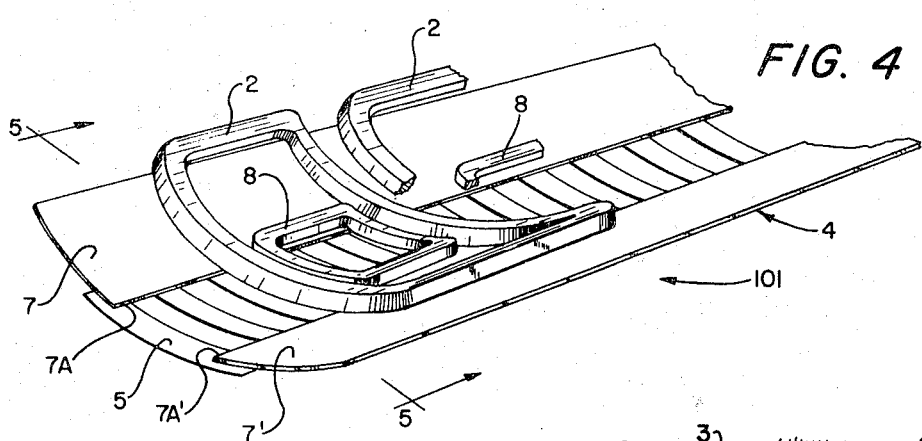
FIG. 4
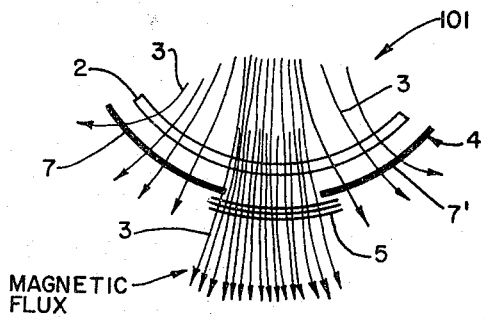
FIG. 5

STABILIZATION AND RIDE CONTROL OF SUSPENDED VEHICLES PROPELLED BY A LINEAR MOTOR

This is a continuation-in-part of application Ser. No. 259,518 filed June 5, 1972 now abandoned; the record in said application is hereby incorporated herein by reference.

The present invention relates to stabilization and active oscillation damping of suspended vehicles and, more particularly, to vehicles which are propelled by synchronous motor drivers.

As is evident in the discussion herein, the system described has use in any vehicular network for high-speed, ground-transportation systems (HSGT; see Proceedings of the IEEE, May 1973 for an up-to-date discussion of HSGT). which employ electric synchronous motor drivers, but the explanation that follows is made mostly with reference to the magneplane of the application for Letters Pat. Ser. No. 165,616, filed July 23, 1971 by the present inventors (now U.S. Pat. No. 3,768,417) hereby incorporated herein by reference. The magneplane is a cylindrical vehicle preferably equipped with superconductor coils and is suspended resiliently by eddy current repulsion about one foot above a cylindrical trough-shaped guideway which surrounds the lower one-third of the vehicle circumference. The vehicle is free to roll so as to assume the correct bank angle in curves. It is propelled by a traveling magnetic field generated by current loops which form integral part of the guideway. The traveling field is synchronized by wayside control units on the basis of information transmitted from the vehicle; it reacts upon the superconducting vehicle coils to provide synchronous acceleration, deceleration, and cruise. Dynamic calculations and model experiments show that the magneplane in motion is subject to a number of short-term movements that include heave (i.e., vertical motion), sway (i.e., side-to-side motion); roll (i.e., rotation about the longitudinal axis), pitch (i.e., rotation about the transverse axis), hunting (i.e., fore and aft pulsations about a stable phase position), and yaw (i.e., rotation about the vertical axis). As a consequence of the various short-term movements, the ride quality of the magneplane is degraded. It has been found, for present purposes, that passive damping provided by viscous or eddy current damping elements, for example, does not furnish the ride quality required for such vehicles.

Accordingly, it is an object of the present invention to provide both propulsion and active ride control of a levitated vehicle by means of a linear synchronous motor with active feedback control.

With reference particularly to the magneplane, which is suspended above the guideway by virtue of eddy current forces between conductive leviation strips at either side of the guideway and the magnetic field of the vehicle, sway is caused by the occurrence of attractive forces between the outermost edge of the superconductor coils which produce the vehicle field and eddy currents in the outer-most edge of the levitation strips. This edge effects tends to amplify small deviations of the vehicle from the center of the guideway by counteracting centering forces which attempt to return it to the center. The edge effect also has the tendency to induce rolling motion when the vehicle approaches an edge of the guideway. Another object of the invention is to provide means to mitigate both the sway and the roll oscillations of the magneplane by achieving a magnetic keel effect which can be coupled to the active feedback control.

These and further objects are hereinafter discussed in detail and are particularly delineated in the appended claims.

In summary, the objects of the invention are attained in a HSGT system in which there is provided stabilization and active oscillation damping of a suspended vehicle. The system includes means on the vehicle for creating a magnetic field which interacts with a traveling magnetic propulsion field produced in a guideway which receives the vehicle, thereby to effect synchronous acceleration, deceleration and/or cruise forces upon the vehicle. The amplitude and the frequency of the traveling magnetic field can be varied, the latter to change the spatial position of the propulsion field relative to that of the vehicle field. The vehicle contains position sensors, accelerometers and/or magnetic field sensors to sense vehicle motion in all degrees of freedom and to supply signals that permit control of vehicle behavior. The signals are communicated to a power source that energizes the system to effect changes in the amplitude and/or frequency of the propulsion field, thereby to effect stabilization and oscillation damping of the vehicle. In a variation of the system a magnetic keel is provided to supply righting moments and to reduce sway in magneplane-type systems. The magnetic keel can be used alone or in conjunction with the feedback.

The invention is hereinafter described with reference to the accompanying drawing in which:

FIG. 1A is a diagrammatic representation of a levitated vehicle of the magneplane type and a guideway and shows the interacting magnetic field forces upon the vehicle at one particular longitudinal position of the vehicle field relative to the traveling magnetic field of the guideway, the vehicle field being slightly forward of the reference positions of the guideway field which is moving toward the left in the figure;

FIG. 1B is a representation similar to FIG. 1A except that the relative positions of the vehicle field and the guideway field are changed so that the vehicle field is positioned at the reference position, i.e., halfway between the poles of the guideway field;

FIG. 1C is a representation similar to FIG. 1B except that the relative positions of the vehicle field and the guideway field are changed so that the vehicle field is slightly aft of the reference position;

FIG. 2 is a force diagram showing interacting forces between the vehicle field and the guideway field as a function of the relative positions (i.e., phase displacement) of the two field;

FIG. 3 is a diagrammatic-section view, partially in block diagram form, taken upon the lines 3—3 in FIG. 1A, looking in the direction of the arrows;

FIG. 4 is an isometric partial view of a magneplane to show, diagrammatically, a plurality of superconductor coils to provide levitation and propulsion forces and a plurality of magnetic-keel coils;

FIG. 5 is a view taken upon the lines 5—5 in FIG. 4 looking in the direction of the arrows.

Figure 6:
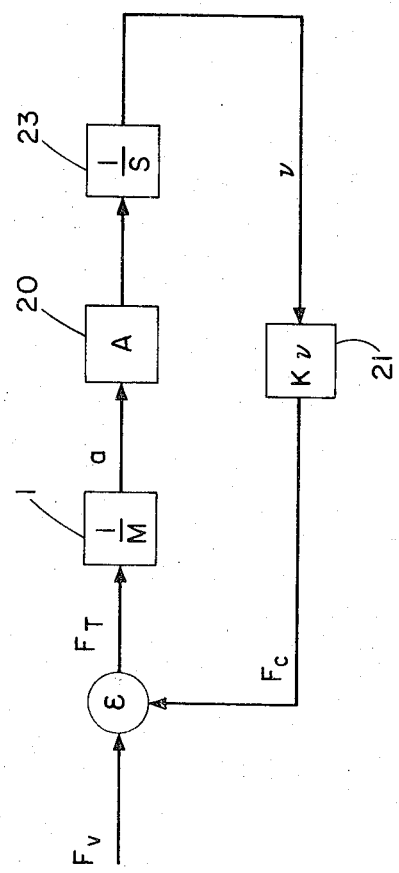
FIG. 6 is a simplified block diagram of the vehicle dynamics in the vertical direction, including active ride control.

Turning now to the figures, a high speed transportation (HSGT) system is shown at 101. The system shown in the figures and discussed hereinafter, is the magneplane system of said application, but it is recognized that at least some of the novel stabilization and damping techniques described in connection therewith have use in connection with other HSGT vehicles since many proposed HSGT vehicles have problems with undamped or underdamped suspension mechanisms. Generally speaking, the active ride control of the present invention can be employed to improve ride quality of all HSGT apparatus which employ linear-motor propulsion. There follows a brief overall description of the present apparatus, then an explanation of the stabilization and damping aspects thereof, and then a discussion of a magnetic-keel which has a passive stabilizing effects but which can be employed in an active-damping system.

With reference to FIGS. 3, 4 and 5, the system 101 comprises a magnetically levitated vehicle 1 which contains a plurality of superconductor coils 2 located at the lower part of the vehicle to create the high intensity magnetic field labeled 3 in FIG. 5. An active, trough-shaped guideway 4, adapted to receive the vehicle 1, contains current loops 5 which, when energized, create a traveling magnetic propulsion field which interacts with the vehicle magnetic field to provide synchronous acceleration, deceleration and cruise forces upon the vehicle 1. The current loops, as explained in detail in said application, form the armature winding of a polyphase linear synchronous motor. Power to energize the winding 5 is supplied by an electric power source 6. The block labeled 6, as later discussed, also contains controls to receive feedback signals for damping purposes. The electric power source and control 6 is preferably a cycloconverter and, as such, can adjust the amplitude of the propulsion field and its frequency (i.e., its linear velocity along the guideway 4). Propulsion is accomplished by electromagnetic interaction between the field 3 and the traveling propulsion field of the winding 5. Levitation is effected by eddy-current forces provided by eddy currents induced in the passive levitation conductors shown at 7 and 7' at each side of the trough-shaped guideway 4, interacting with the superconductor field 3 which induced the eddy currents in the first place. The current-carrying propulsion conductors 5, as shown, are positioned at the center of the guideway 4 between the passive conductors. The positioning alone has a stabilizing influence upon the vehicle 7, but stability is enhanced by the presence of the keel coils shown at 8, as is mentioned in greater detail later. Active damping of the vehicle 1, as is explained in the next few paragraphs, is accomplished by making momentary or pulsed changes in either or both of the frequency and amplitude of the propulsion field. Such momentary changes are produced in such a way that there is no net propulsion force upon the vehicle, but the timing of the pulses is such that the momentary vertical and lateral forces upon the vehicle are opposite to the particular instability motion being counteracted.

A simple explanation of the principles involved is made in connection with FIGS. 1A–1C. The guideway 4 contains the armature coils of a linear motor, which are energized by the multi-phase variable frequency a-c source 6, as mentioned. The traveling magnetic field created by the coils "pulls" the vehicle along at exactly the same speed as the traveling magnetic wave, and power is transferred from the magnetic field to the moving vehicle. If the vehicle is located as shown in FIG. 1B, (i.e., the north [N] and south [S] poles of the vehicle 1 exactly mid-point between the north and south poles of the guideway), then the traveling field produces a horizontal accleration force (i.e., to the left in FIG. 1B) but no vertical force; the downward attractive force between unlike poles is balanced by upward repulsive force between like poles. If, however, the traveling field is advanced relative to the vehicle, there is net upward force as shown in FIG. 1A; and if the field is retarded there is a net downward force as shown in FIG. 1C. FIGS. 1A–1C show clearly why the displacement of the vehicle relative to the field has a profound effect on vertical forces. This "phase displacement," $\theta$, also has effect on the propulsion force and on the lateral forces on the vehicle. In a very simplified model, the force depends on $\theta$ as shown in FIG. 2.

In order to provide active ride control, it is necessary to sense the inertial behavior of the vehicle and compare this to the ideal behavior based on a smooth guideway and no perturbing forces. The "error" signal can then be used in a feedback control system to control the linear motor forces acting on the vehicle in such a way as to minimize unwanted motion. The techniques of control theory are well developed and can be directly applied to the design of this feedback control. (See for example, "Optimal Control and Introduction to the Theory and its Applications" McGraw-Hill Publishing Company, 1966 by Athans and Falb, as well as many technical articles by Michael Athans sponsored by the Electronic Systems Laboratory and others and deposited in the Massachusetts Institute of Technology library system.) The exact control scheme will depend on many attributes of the vehicle and guideway and may involve rather complex digital or analog computer circuitry for its implementation. The net result, however, is to produce controlled perturbation forces that will cancel undesired perturbation forces caused by weather conditions, guideway roughness, or terrain characteristics. The basic control means involves varying the phase displacement, and this, in turn, requires controlling the a-c output of the linear motor power source 6. The power source 6 will typically be a variable frequency, variable amplitude cycloconverter, as mentioned above, which converts available power, frequency, such as 60 Hz commercial power, to a range of 0 to 30 Hz, as required for propulsion. The output of the cycloconverter can be thought of as the superposition of two signals: (1) the frequency and amplitude needed to provide the desired acceleration, cruise, or deceleration, and (2) the frequency and amplitude needed to produce the desired perturbations of force between the linear motor and the vehicle. The timing and amplitude of these perturbing forces is used to improve the ride quality and to allow a lower cost guideway with significant roughness.

To implement this active control, it is necessary to measure the behavior of the vehicle. Such measuring must be capable of sensing vehicle motion in all degrees of freedom. To accomplish this purpose vehicle sensors and signal processors represented by the block 9 are provided. The sensors include accelerometers (six accelerometers to sense instantaneous accelerations of the vehicle in all degrees of freedom), height sensors, and magnetic field sensors. The output information of the various sensors is processed by data processing logic to translate said information into control signals needed to apply damping to all modes of vehicle oscillation, namely: oscillations in heave, sway, roll, pitch, hunting, and yaw (for typical sensors reference may be made, for example, to a journal article entitled "Impact Test Accelerometers" by William R. Stern (of Setra Systems, Inc.) in the November/December 1971 issue of Measurements and Data.) It is also desirable to known something about the guideway behavior, such as its incline, radius of curvature, and bank angle. A computer, or the equivalent, is then used to determine the optimum turn-on times of the cycloconverter power switches.

In order to effect control it is necessary to have a communication link between the cycloconverter and the vehicle sensors. This link can be a radio link, but it can also utilize the guideway as part of a transmission line in a way somewhat similar to that used for railroad signalling or electrification. Typically the vehicle couples a signal into the guideway by inductive, capacitive, or conductive means, and this signal is transmitted down the guideway to the wayside cycloconverter. The left and right sides 7 and 7' of the guideway can be used as two conductors of a transmission line, or the entire guideway can be used as one conductor relative to ground, or relative to a "third rail", or overhead conductors. Means for coupling into the guideway includes the induction coil shown at 11 or capacitive plates (not shown) in the vehicle or sliding or rolling electric contacts. In the latter case the same sliding contacts can also be used for power pickup by the vehicle. In some situations, it may even be desirable to locate the power converter on the vehicle, and in this case only the power output signal needs to be transmitted by the guideway to the linear motor windings.

The use of automatic feedback control, generally, to provide improved ride quality is not new and, in fact, is used routinely on aircraft and ocean going ships. Moreover, the use of on board active ride control systems for magnetically levitated vehicles has been proposed by others (see "Technical Feasibility of Magnetic Levitation as a Suspension System for High-Speed Ground Transportation Vehicles," a report dated February 1972 by Davis et al. of Ford Motor Company, prepared for DOT.) However, because of the fact that the linear synchronous motor in the systems 101 is being used simultaneously for propulation and active ride control, some further explanation of the design principles may be in order. In order to simplify the explanation, it will be restricted to the control of heave (i.e., vertical motion), but the linear synchronous motor is fundamentally capable of providing active control of the other motions, mentioned previously although not all simultaneously. Additionally, other active or passive ride control schemes may be used in conjunction with the scheme described herein.

The vertical force on the vehicle is the sum of two parts, one due to the lift force from the induced repulsion, and one from the action of the linear motor. The linear motor provides both forward and reverse forces and vertical forces as before noted. The force is proportional to armature current, and depends upon the spatial displacement between the cryogenic vehicle field and the traveling field produced by the armature winding of the linear synchronous motor. Typical force-displacement curves are shown in FIG. 2. It will be noted that for a range of displacement near $\theta=0$ the thrust is nearly constant, while the vertical force varies considerably, typically between about $+.1g$ and $-.1g$.

The current in the winding can be varied in order to maintain the desired thrust and hence keep the vehicle in synchronism, while the displacement can be varied in order to control the vertical force. The slight interaction between these two controls need not cause serious complications.

In order to effect control, it is necessary to sense the vertical motion of the vehicle and feed back signals to the wayside power converter. FIG. 6 shows a simplified block diagram of the vehicle dynamics in the vertical direction including active ride control. In this figure the vertical forces on the vehicle $F_v$, other than those produced by the linear synchronous motor, are the assumed input and the vehicle vertical velocity $v$ is determined by integrating once a signal $a$ derived from the accelerometer shown at 20 whose output is connected to an integrator 23 which calculates the velocity $v$. The velocity $v$ is used to control the vertical control force labeled $F_c$ by means of the linear motor (the block 21 in FIG. 6 represents the linear motor as well as its power source) and controlling electronics; $F_c = K_v \cdot v_1$ where $K_v$ is a constant. The total force designated $F_T$ on the vehicle 1 in FIG. 6 is, therefore, the summation provided $F_v$ and $F_c$, as indicated in FIG. 6. For a full scale system, it is desirable to have both relative feedback that relates the vehicle to the guideway, and absolute feedback that relates the vehicle to an inertial reference frame. This can be accomplished by using both a height-above-guideway sensor and an accelerometer. The vehicle forward velocity can be determined by measuring the frequency and phase displacement of the armature current, and the basic profile of the guideway is known so there can be provided a signal which gives the preferred vehicle height as a function of time.

Various unpredicatable perturbing forces will act on the vehicle and it is one purpose of the feedback to minimize the discomfort caused by these forces. Possible perturbing force sources are wind gusts, guideway irregularities, and transients on the electric power supply system. The detailed design of the control system cannot be done until more is known about the nature of perturbing forces, but the literature of optimal control theory contains design examples for similar types of control problems. It will be noted, in particular, that the design of the control system may make use of known aspects of terrain, so that in windy areas the control can be optimized to minimize the effect of wind, while in areas of considerable earth movement, the design can be optimized to minimize the effect of unpredicatable guideway irregularities. Of particular importance is the fact that it is possible to predict many guideway irregularities that could produce an uncomfortable ride, and therefore the control system may have advance knowledge of certain perturbing forces.

Although the exact design for a full scale system has not been done, experiments with a similar system for a one-twentyfifth scale model have proven the feasibility of the idea. This is described in an M.I.T. masters' thesis, "Electronic Control of a Linear Synchronous Motor", Joel Schultz, 1973, a copy of which accompanies herewith; the thesis, which reports work done by the master's candidate under the supervision of the present inventors, is hereby incorporated herein by reference. The thesis was deposited in the M.I.T. library system on Oct. 2, 1973. The experimental system discussed in the thesis uses a Hall effect magnetic field sensor to detect the vehicle phase displacement and an FM transmitter to relay this signal to the power conditioning unit. The motor excitation is derived from a multi-kilowatt, three-phase cycloconverter, and the frequency of excitation is determined by an electronic oscillator. The control system employs a phase locked loop so that over a time period of several cycles the frequency can be varied by the signal from the vehicle, thereby to maintain synchronism. The vertical ride control is accomplished by using a vertical accelerometer on the vehicle and transmitting an additional signal from the vehicle to the power control system. If the vehicle is accelerated upwards by a guideway irregularity, then the phase of the motor excitation is changed so as to produce a phase displacement between vehicle field and guideway field. This change is such as to produce a downward force on the vehicle that will reduce the upward acceleration. Standard feedback control concepts can be used to design the feedback system and insure stability.

Mention is made above of the occurrence of sway of the magneplane, due primarily to edge effect, and induced rolling which arises from the same effect. Both of these effects can be controlled by use of a magnetic keel coupled with active damping. With reference to FIG. 4, the superconducting levitation coils 2 of the magneplane vehicle are provided with the supplementary windings 8 near their central region. This figure shows the spatial relationship between the coils and the guideway, all intervening parts of the vehicle being omitted for clarity. The supplementary windings 8 (called "keel coils") as shown in FIG. 5, generate an increased magnetic field intensity along the centerline of the vehicle, called a "magnetic keel" herein. This magnetic keel exerts a repulsive force against the inner edges labeled 7A and 7A' of the guideway levitation strips 7 and 7', respectively, thereby producing both a centering force and a righting moment whenever the vehicle deviates from the guideway centerline. The magnetic keel therefore counter-acts the undesirable edge effect. It also provides increased coupling forces with respect to the synchronous propulsion field generated by the propulsion conductors 5 in the center strip of the guideway 4. The magnetic keel can, therefore, provide passive stabilizing forces, but it can, as well, be employed in conjunction with the active damping and stabilizing mechanism previously discussed.

Thus, in accordance with the foregoing teaching, active damping of slow oscillations is provided by adjusting propulsion current in the coils 5 in such a way as to generate vertical and horizontal forces, properly timed to damp oscillations. FIG. 2 shows the variation of longitudinal, lateral and vertical forces exerted on the vehicle by the synchronous propulsion field, as the position of the vehicle is changed with respect to the traveling field by a small amount centered about its normal propulsion position. The lateral force appears only if the vehicle is displaced from the centerline. In addition to the forces shown, there is also a variable righting moment, which is produced by interaction between the propulsion field and the magnetic keel.

It should be noted that the active ride control described here differs in a fundamental way from the active suspension control used in certain ferromagnetic attraction suspensions. In the latter, active control of the suspension magnet current is necessary to overcome the inherent instability of any attractive magnetic force; without control, the vehicle would make violent contact with the supporting steel rail. The respulsive suspension of magneplanes, in contrast, is inherently stable, and inertia of the vehicle serves to smooth out high frequency oscillations of the guideway. The active ride control according to the present invention serves, in the cases of a magneplane system, only to provide active damping to inherently undamped oscillations of low frequency. It does not need to achieve response to high frequency guideway undulations to accomplish this.

It is an essential feature of the invention that no onboard power is required to accomplish the active damping; all of the necessary power can be derived from the wayside propulsion system.

Modifications of the invention herein described will occur to persons skilled in the art and all such modifications are deemed to be within the spirit and scope of the invention as defined in the appended claims.

What is claimed is:

1. Apparatus to provide stabilization and active oscillation damping of a suspended vehicle that comprises, in combination: means on the vehicle for creating a d-c magnetic field, active guideway means adapted to receive the vehicle and containing current loops which, when energized, create a linearly traveling magnetic propulsion field to provide at least one of synchronous acceleration, deceleration and cruise forces upon the vehicle, electric power source means connected to energize the currents loops, means for effecting momentary adjustment of the amplitude of the propulsion field and its frequency, the latter to change the linear spatial position of the propulsion field relative to that of the vehicle field, sensor means on the vehicle to sense vehicle motion in at least one degree of freedom for the purpose of controlling vehicle behavior by actively damping unwanted motion, and communication means operable to transmit a signal from the sensor means to the power source to effect changes therein, thereby to adjust at least one of the amplitude and the frequency of the propulsion field so as to provide stabilization and oscillation damping of the vehicle.

2. Apparatus as claimed in claim 1 in which the vehicle is cylindrical and in which the guideway means is trough-shaped.

3. Apparatus as claimed in claim 2 in which the means for creating a magnet field on the vehicle includes a plurality of on-board magnets located along the lower part of the vehicle and oriented alternately to provide alternate regions of north and south polarity along said lower part, and in which the guideway includes continuous, passive levitation conductors at each side of the guideway and current-carrying propulsion conductors at the center of the guideway between the passive conductors, thereby to provide levitation forces on the moving vehicle as well as the synchronous acceleration, deceleration and cruise forces.

4. Apparatus as claimed in claim 3 in which the on-board magnets comprise a plurality of superconductor coils.

5. Apparatus as claimed in claim 3 in which the passive levitation conductors form part of the communication means.

6. Apparatus as claimed in claim 1 in which the sensor means and the communication means form a feedback control system to provide vehicle control and in which the system includes magnetic phase position sensors, a telemetering transmitter capable of transmitting information to a wayside power control-system, data processing circuitry and at least one of: accelerometers, gyroscopic sensors, magnetic field detectors, and position sensors.

7. Apparatus as claimed in claim 1 in which the guideway means is trough-shaped and contains passive levitation conductors at each side of the guideway electromagnetically coupled with the magnetic field of the vehicle thereby to provide magnetic levitation forces on the moving vehicle and current-carrying propulsion conductors at the center of the trough between the passive conductors.

8. Apparatus as claimed in claim 7 in which the means on the vehicle for creating a magnetic field comprises on-board magnets located at the lower part of the vehicle, said magnets being adapted to produce higher magnetic field intensities at the center of said lower part of the vehicle than toward the sides thereof, thereby to provide increased centering forces and righting moments as well as increased interaction with the propulsion field.

9. Apparatus as claimed in claim 8 in which the sensor means and the communication means form a feedback control system which is adapted, among other things, to provide righting moments about the roll axis of the vehicle properly timed as to damp roll oscillation.

10. Apparatus as claimed in claim 9 in which the on-board portion of the feedback control system contains six accelerometers connected so as to provide information concerning the instantaneous accelerations of the vehicle in all degrees of freedom, and which further includes data processing logic to translate said information into control signals required to apply active damping to all modes of vehicle oscillation, namely, oscillations in heave, sway, roll, pitch, hunting and yaw.

11. Apparatus as claimed in claim 1 in which the vehicle is cylindrical, in which the guideway is trough-shaped, in which the means for creating a magnet field on the vehicle includes a plurality of on-board magnets located along the lower part of the vehicle and oriented alternately to provide alternate regions of north and south polarity along said lower part, and in which the guideway includes continuous, passive levitation conductors at each side of the trough and current-carrying propulsion conductors at the center of the trough between the passive conductors, thereby to provide levitation forces on the moving vehicle as well as at least one of synchronous acceleration, deceleration and cruise forces.

12. Apparatus as claimed in claim 11 in which the sensor means and the communication means form a power control system to provide vehicle control and in which the system includes magnetic phase position sensors, a telemetering transmitter capable of transmitting information to a wayside power control system, and at least one of: accelerometers, gyroscopic sensors, and data processing logic.

13. Apparatus as claimed in claim 12 in which the on-board magnets are adapted to produce higher magnetic field intensities at the center of said lower part of the vehicle than toward the sides thereof, thereby to provide increased centering forces and righting moments as well as increased interaction with the propulsion field.

14. Apparatus as claimed in claim 13, in which means is provided to apply in addition righting moments about the roll-axis of the vehicle, properly times so as to damp roll oscillations.

15. Apparatus as claimed in claim 14, in which the on-board portion of the power control system contains six accelerometers connected so as to provide information concerning the instantaneous accelerations of the vehicle in all degrees of freedom, and which further includes data processing logic to translate said information into control signals required to apply active damping to all modes of vehicle oscillation, namely oscillations in heave, sway, roll, pitch, hunting and yaw.

16. Apparatus to provide stabilization of a repulsively magnetically suspended vehicle that comprises, in combination: trough-shaped guideway means adapted to receive a vehicle and containing passive levitation conductors at each side of said guideway, means on the vehicle for creating a magnetic field along the lower part of the vehicle and adapted to produce higher magnetic field intensities at the center of said lower part of the vehicle than at the sides, electromagnetic interaction between the vehicle magnetic field and the passive conductors acting, as the vehicle moves along the guideway, to provide levitation forces on the moving vehicle, the levitation forces, because of said higher magnetic field intensities at the center of the lower part of the vehicle, acting to provide increased centering forces and righting moments on the vehicle, and means for propelling the vehicle along the guideway.

17. A method of providing stabilization and active damping of a magnetically levitated and propelled vehicle, that comprises:
creating a high intensity d-c magnetic field on the vehicle; creating a linear traveling a-c magnetic field which interacts with the vehicle magnetic field to effect synchronous linear motion of the vehicle; sensing vehicle motion in at least one degree of freedom and providing a signal for the purpose of controlling vehicle behavior, by actively damping unwanted motion, and effecting momentary adjustment of at least one of the amplitude and the frequency of the a-c magnetic field in response to the signal which is indicative of the occurrence of said unwanted motion.

* * * * *